United States Patent [19]

Oltman et al.

[11] Patent Number: 4,649,090

[45] Date of Patent: Mar. 10, 1987

[54] SEAL TAB FOR A METAL-AIR ELECTROCHEMICAL CELL

[75] Inventors: John E. Oltman, Mt. Horeb; Robert B. Dopp; Denis D. Carpenter, both of Madison, all of Wis.

[73] Assignee: Rayovac Corporation, Madison, Wis.

[21] Appl. No.: 821,430

[22] Filed: Jan. 22, 1986

[51] Int. Cl.⁴ .................... H01M 12/06; C09U 7/02
[52] U.S. Cl. ...................................... 429/29; 429/48; 429/110; 428/343; 428/354
[58] Field of Search ............... 428/343, 354, 349, 515, 428/DIG. 910; 429/27, 48, 110, 162, 185

[56] References Cited

U.S. PATENT DOCUMENTS

| | | | |
|---|---|---|---|
| 3,741,841 | 6/1973 | Toyoda et al. | 156/229 |
| 3,887,745 | 6/1975 | Yoshii et al. | 428/213 |
| 4,211,811 | 7/1980 | Bordini et al. | 428/220 |
| 4,393,115 | 7/1983 | Yoshii et al. | 428/323 |
| 4,414,261 | 11/1983 | Nanbu | 428/213 |
| 4,451,533 | 5/1984 | Wong et al. | 428/337 |
| 4,536,441 | 8/1985 | Schmeer et al. | 428/343 X |
| 4,557,983 | 12/1985 | Sauer | 429/27 |

Primary Examiner—Anthony Skapars
Attorney, Agent, or Firm—Kenyon & Kenyon

[57] ABSTRACT

A seal tab consisting of an acrylic adhesive applied to a biaxially-oriented three-ply synthetic paper of polypropylene is used as a sealing means for metal-air electrochemical cells, and batteries constructed thereof. The seal tabs prevent loss of rate capability and capacity due to interactions with the surrounding environment prior to the placement into service of metal air cells, yet without so isolating the cells such that the initial open circuit voltage is deemed unacceptable by the end user. Additionally, the seal tab, as provided, is easily and cleanly removed, which enhances the cell's consumer appeal.

12 Claims, 3 Drawing Figures

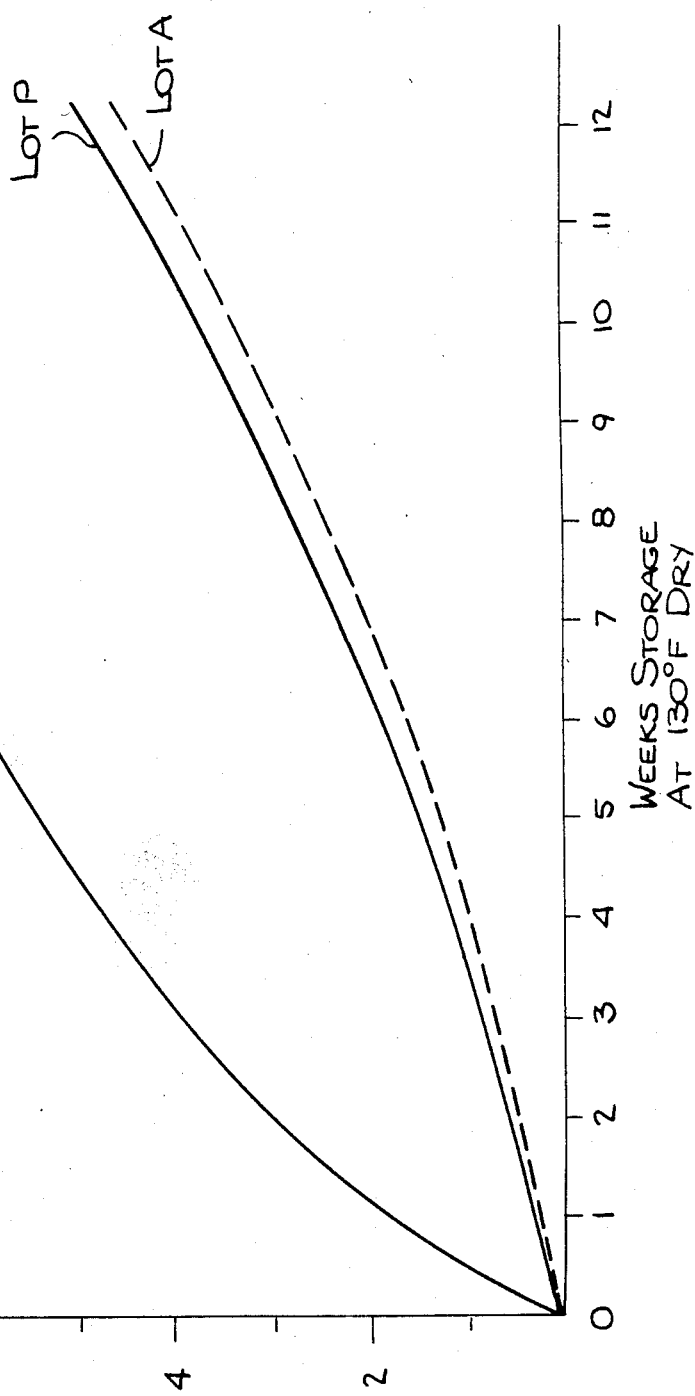

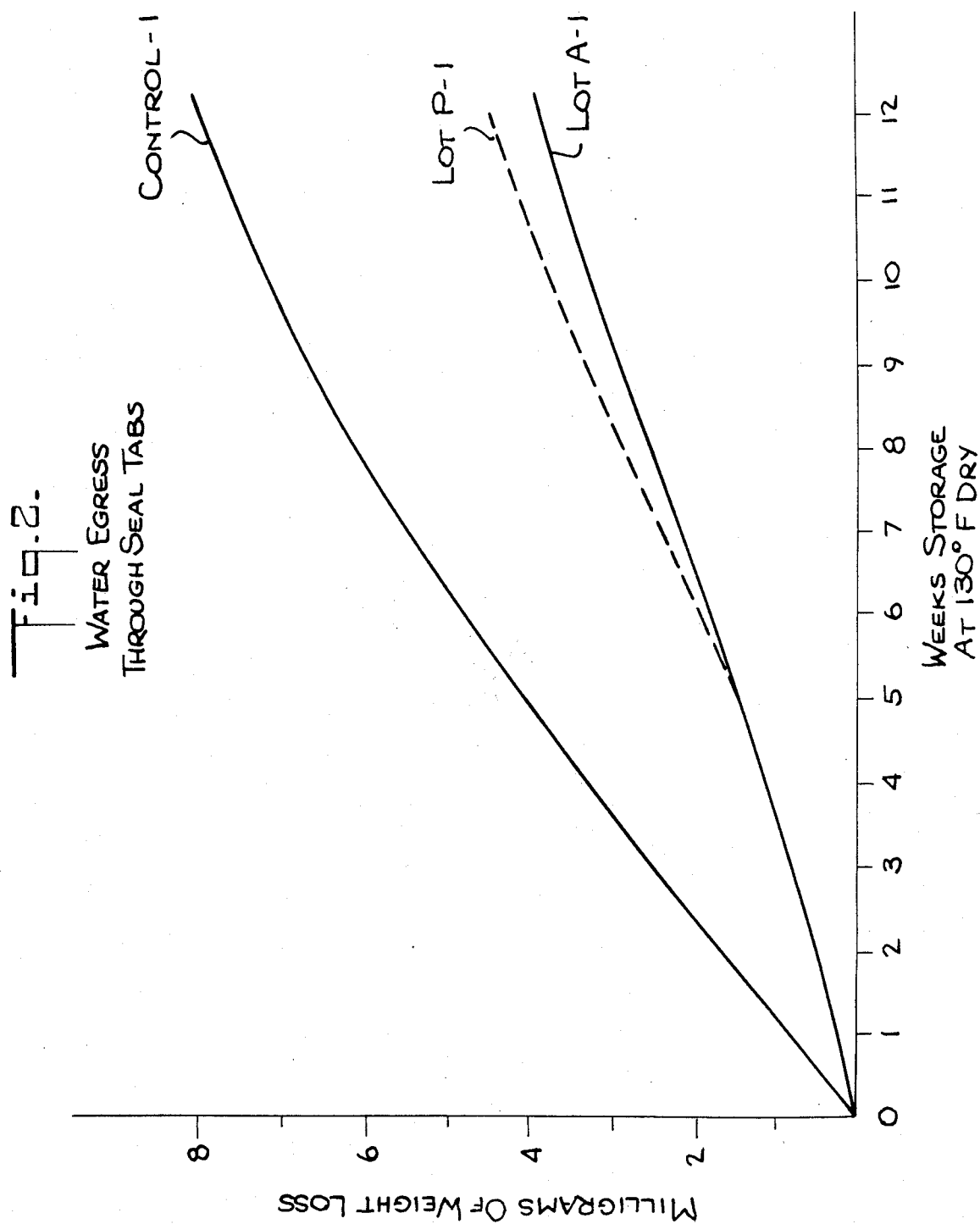

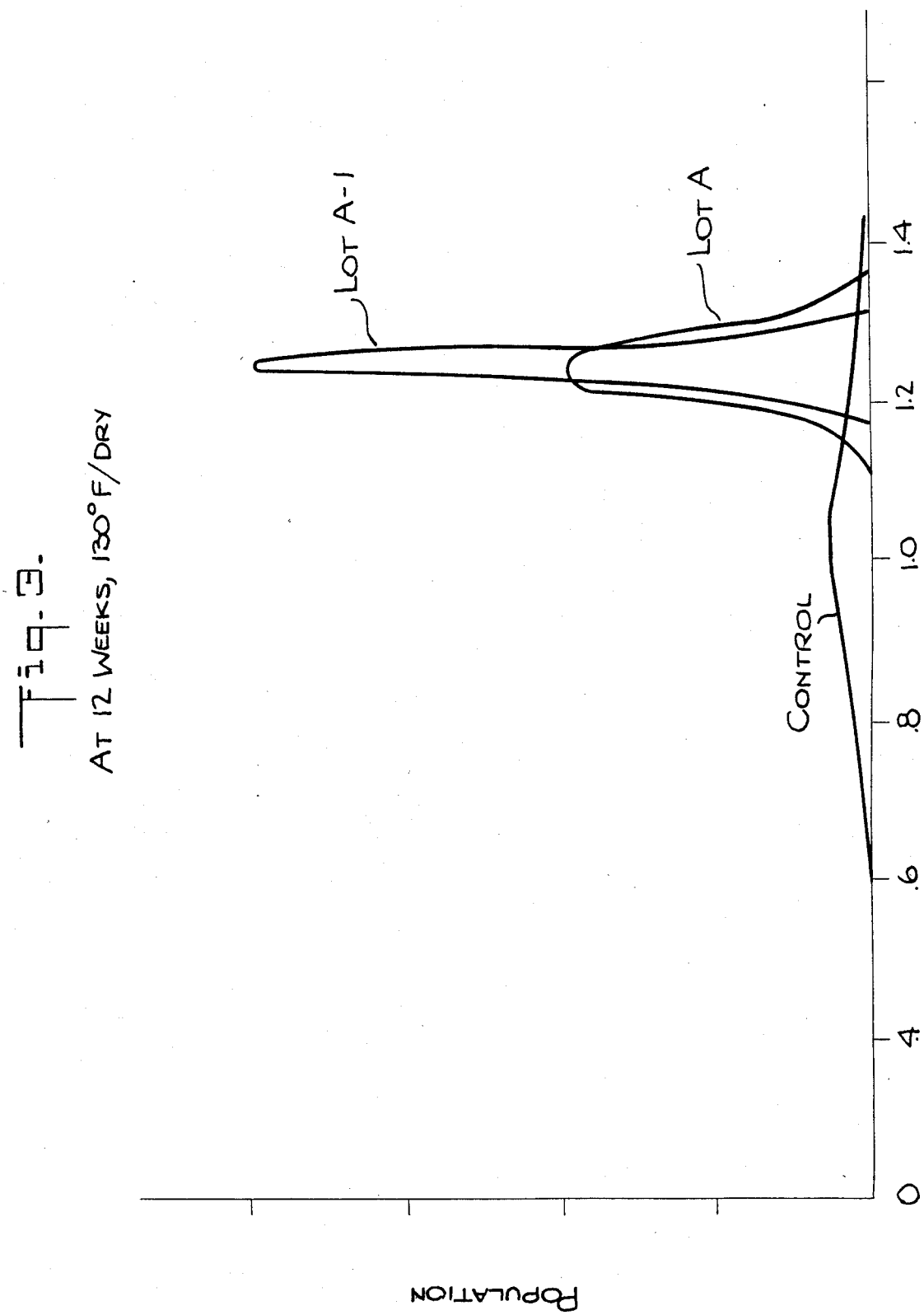

SEAL TAB FOR A METAL-AIR ELECTROCHEMICAL CELL

FIELD OF INVENTION

This invention pertains generally to metal-air electrochemical cells and batteries constructed thereof, and more particularly to an improved sealing means for such cells which prevents the loss of rate capability and capacity due to interactions with the surrounding environment between the time such cells are manufactured and when they are placed into service.

BACKGROUND OF THE INVENTION

Metal-air electrochemical cells, especially those wherein the metal is powdered zinc, have become increasingly popular power sources for small electrical devices. Metal-air cells have an inherent advantage over most other electrochemical cell systems in that for a given cell volume, metal-air cells have a greater capacity. The greater capacity is due to the fact that in metal-air electrochemical systems, oxygen from the atmosphere, which is essentially limitless, is the active cathode material. Hence, metal-air electrochemical cells do not contain consumable cathode material and, therefore, can contain a greater amount of anodic material. It is this increase in the amount of anodic material which leads to the increased, per unit volume, capacity of metal-air cells. Due to their high capacity and relatively flat discharge curve, metal-air cells are particularly adapted for use in those applications which require moderate drains and continuous discharge usage.

In metal-air cells, air containing oxygen, the cathodic reagent, enters the cell through port(s) in the cell can which are immediately adjacent to a cathode assembly. The air diffuses into an air cathode subassembly where the oxygen is reacted. This air cathode subassembly generally consists of mixtures of activating chemicals supported by a complex physical structure. The air cathode subassembly also slows the rate of diffusion of other gases, particularly carbon dioxide and water vapor, through the electrode to the reaction site. These gases in air, particularly water vapor, can have a profound limiting effect on the capacity of the cell.

Once the oxygen has entered the cell, it diffuses through a separator, which is a moisture barrier usually of a plastic-like material impervious to liquids such as the alkaline electrolyte, and reacts with the water in the electrolyte. This reaction consumes electrons and produces hydroxide ions which, after migrating into the anode chamber, oxidize the metal anode, generally producing two electrons for each atom of the metal reacted. Electrochemical cells comprised of metal anodes and air cathodes are well known, and are more fully discussed in references such as U.S. Pat. Nos. 3,149,900 (Elmore and Tanner) and U.S. Pat. No. 3,276,909 (Moos).

A major problem associated with metal-air electrochemical cells is the loss of cell capacity as a result of storage, shipping, etc. of the cell between the time the cell is manufactured and the time the cell is used as a source of electrical power. Another often-noticed limitation is the depressed open circuit voltage of such cells upon placement into service after storage, often of only a few weeks duration. The problems and limitations observed with metal-air electrochemical cells stem from the same factor which provides for their capacity advantage: interaction with the environment. Since the diffusion of oxygen into the cells begins a series of reactions which ultimately consume the anodic material, it is readily apparent that a significant ingress of oxygen into a metal-air electrochemical cell during storage will significantly reduce a cell's capacity, therefore reducing the viable shelf life for such an electrochemical cell. However, the ingress or egress of water vapor during storage can have an even more dramatic effect on the performance of metal-air cells after storage of even a few months.

Water is present in metal-air electrochemical cells since the electrolytes in such cells are aqueous alkaline solutions. And since the water in the electrolyte is directly involved in the reactions which produce the electric energy, any reduction in the water content of the cell due to the egress of water vapor attributable to a lower relative humidity in the external cell environment will decrease the reaction rate, i.e., the production of electrons. Such a decrease in the reaction rate necessarily reduces the rate capability and capacity of the cell. The ingress of water vapor, due to a higher relative humidity outside of the cell can have a similar deleterious effect on cell performance, since the cell becomes overfilled with water. The excess of water causes the premature conclusion of the electrochemical reactions and substantially reduces the rate capability of the cell.

In order to diminish the deleterious effects of the environment on metal-air cells, the air entry ports of metal-air cells are normally sealed with removable tabs (or tapes) upon manufacture. The removal of such a seal tab when a cell is placed in service theoretically ensures that the freshly unsealed cell has the approximate capacity of a freshly manufactured cell. Unfortunately, such theoretical fresh cell capacity has been difficult to consistently obtain, since the sealing means heretofore commercially used in the manufacture of metal-air cells have been unable to eliminate the recognized effects of the environment which occur during the storage of metal-air cells.

Presently, the air entry ports of most metal-air cells are sealed upon manufacture by tabs consisting of rubber based adhesives applied to a rubber impregnated paper face stock and overlayed with a polyester film. Metal-air cells sealed with such tabs display substantial reductions in cell capacity upon being placed into service as a source of electrical power after storage. Moreover, such cell tabs exhibit tape delamination, i.e., upon storage for long periods of time and/or at elevated temperatures, the strength of adhesive-to-cell case bond increases to the point where it exceeds the cohesive strength of the paper. When this phenomena occurs, upon removal of the tab, the adhesive and a layer of paper often remain on the cell case. Along with a decrease in cosmetic appeal, such cells often cannot be fully activated and may insulate the cell from electrical contact, thereby allowing for the possible perceived failure of the cell by the consumer.

Another type of cell sealing means, which uses rubber-based adhesives applied directly to polyester film, have been utilized to prevent the loss of cell capacity during storage of the unused cells. Such impervious tapes are quite effective in sealing off the cell from the environment. However, upon only a few weeks storage, the voltage of a metal-air electrochemical cell sealed with such a tape drops to the voltage of the metal-carbon couple, which for metal-air cells having a powdered zinc anode is 0.4 volts. This low voltage results from the insufficient ingress of oxygen to maintain the cell voltage. A consumer, upon removing such a tape from a metal-air cell may have to wait a considerable time before the functional voltage is re-established. In some cases, a consumer may perceive that the cell is defective.

Because of the aforementioned advantages of metal-air electrochemical cells, it is imperative that the environmental effects heretofore incumbent with the storage of metal-air cells be eliminated, without so isolating the cell from the environment such that the open circuit voltage upon placing the cell in service is unacceptable. Therefore, it is an objective of the present invention to provide a removable seal for a metal-air electrochemical cell which allows for the storage of such cells without the attendant decrease in cell performance.

Another objective of the present invention is to provide a removable seal for a metal-air electrochemical cell which reduces the diffusion of water vapor into or out of such cells during storage even under dry conditions at elevated temperatures.

Another objective of the present invention is to provide a removable seal for a metal-air electrochemical cell which allows the open circuit voltage of such cells upon placement in use after storage to have a functional open circuit voltage upon removal of the tab.

These and other subsidiary objectives which will appear are achieved by the practice of the present invention.

SUMMARY OF THE INVENTION

The objectives of the present invention are achieved by covering the air entry ports of metal-air electrochemical cells with a novel, slightly permeable, easily removable three component seal tab. The seal tab of the present invention consists of a biaxially-oriented three-ply synthetic paper of polypropylene to which a removable acrylic adhesive is applied. The bond formed between the acrylic adhesive and the metal face of a metal-air electrochemical cell is weaker than the adhesive to polypropylene paper bond and the cohesive strength of the polypropylene paper. To provide additional protection from the environment, the exposed polypropylene paper surface is covered by a plastic film. A seal tab contructed according to the present invention and applied during manufacture of metal-air electrochemical cells greatly improves the post-storage performance of such cells vis-a-vis cells manufactured and stored with the removable cell tabs of the prior art.

BRIEF DESCRIPTION OF THE DRAWINGS

FIG. 1 is a graph comparing the amount of water egress with time from zinc-air button cells manufactured and stored with removable seal tabs of the present invention and such cells sealed with the removable seal tabs of the prior art.

FIG. 2 is a graph comparing the amount of water egress with time from zinc-air button cells manufactured and stored with removable seal tabs of the present invention and such cells sealed with the removable seal tabs of the prior art, wherein the seal tabs were initially applied to the cells at elevated temperatures.

FIG. 3 is a graph comparing, after storage for twelve weeks under hot, dry conditions, the open circuit voltage of zinc-air button cells manufactured and stored with removable seal tabs of the present invention and such cells sealed with the removable seal tabs of the prior art.

DESCRIPTION OF THE INVENTION

While the present invention is applicable to, and can be used in conjunction with, all types of metal-air electrochemical cells and batteries comprised of such cells, the drawings depict the results of the preferred embodiment herein described, i.e., a zinc-air button cell.

In general, the present invention comprises a novel seal tab for metal-air electrochemical cells, consisting of a three component material which, when made and used according to the teachings described herein, prevents the marked decrease in the rate capability and capacity of metal-air electrochemical cells which have been subject to post-manufacture storage under various conditions. The base material, i.e., the face stock of the seal tab of the present invention is a biaxially-oriented three-ply synthetic paper of polypropylene, such as Kimdura ®, marketed by Kimberly-Clark Corporation. While this face stock material should be between 2.7 mils and 3.7 mils in thickness, the inventors prefer that the polypropylene paper be 3.2 mils ($\pm 10\%$) in thickness.

The material which forms the seal with the surface of the metal-air electrochemical cell is a clear acrylic adhesive, which has been applied to one side of the face stock. The thickness of the adhesive can vary from 0.5 mils to 1.0 mils, with 0.7 mils being preferred by the inventors.

The opposite side of the polypropylene paper face stock is covered with a plastic film to further lessen the observed environmental effects on the performance of metal-air cells after storage. The plastic film can be made of either polyester, approximately 1.5 mils thick, or acetate, approximately 2.0 mils thick.

The three component seal tab of the present invention is applied by mechnical means to the face of the metal-air electrochemical cell which contains the air entry ports. Since various materials may be used as the metal-air electrochemical cell (or battery) container, the acrylic adhesive, which contacts the cell container must display high initial tack, but still be easily removed, from a wide variety of metallic and non-metallic surfaces. While the seal tab of the present invention may be applied to the metal-air electrochemical cell at room temperature, the inventors prefer to apply the seal tab at elevated temperatures, preferably at 200° F.

The seal tab of the present invention does not display tape delamination, even if the metal-air cells are stored for several months at elevated temperatures. With seal tabs of the present invention, the bond formed between acrylic adhesive and the surface of the metal-air electrochemical cell is much weaker than both the bond between the polypropylene face stock and the acrylic adhesive and the cohesive strength of the face stock itself. A novel characteristic of the acrylic adhesive when used in the present invention is that the strength of the bond between it and the metal-air cell container does not significantly increase with time and/or temperature.

Seal tabs of the present invention allow for different rates of transport of the various gases into and out of the metal-air electrochemical cells. While the present invention allows the ingress of enough oxygen such that the open circuit voltage of the metal-air electrochemical cell is functional even after several months storage, it reduces appreciably the ingress or egress of water vapor.

EXPERIMENTAL RESULTS

In order to quantify the magnitude of the benefits of the present invention, comparative tests of identical zinc-air button cells stored for various periods of time under various conditions were conducted. "Control" cells are zinc-air button cells whose air entry ports were sealed during storage by seal tabs of the standard, commercial construction, i.e.. a rubber impregnated paper containing a rubber-based adhesive and a polyester film. "Lot A" cells are zinc-air button cells whose air entry ports were sealed during storage by seal tabs of the present invention wherein the plastic film was acetate. "Lot P" cells are zinc-air button cells whose air entry ports were sealed during storage by seal tabs of the present invention wherein the plastic film was polyester. The seal tabs of the "Control", "Lot A" and "Lot P" cells were initially affixed to the cells at room temperature. "Control-1" cells, "Lot A-1" cells and "Lot P-1" cells are "Control", "Lot A" and "Lot P" cells, respectively, wherein the seal tabs were initially affixed to the cells at 200° F.

Test 1:
To determine how much water diffuses through the various seal tabs, zinc-air button cells were weighed once a week, for twelve weeks while being stored at 130° F. Any reduction in cell weight was attributed to the egress of water vapor, since any diffusion of oxygen would have increased cell weight. The results of this test, graphed in FIGS. 1 and 2, clearly demonstrate that seal tabs of the present invention are approximately twice as effective as those of the prior art in preventing the egress of water vapor and that seal tabs applied at 200° F. are more effective in preventing the egress of water vapor than such tabs applied at room temperature.

Test 2:
To determine the effects on cell capacity of the seal tabs, the capacity of the zinc-air button cells were measured under a continuous 1500-ohm drain to both 1.1 V and 0.9 V after being stored for eight weeks at 130° F. These capacities was then compared with those of freshly manufactured zinc-air button cells. The results of this test, which are shown in Table I, clearly indicate that when seal tabs are applied to zinc-air button cells, seal tabs made according to the present invention eliminate at least 75% of the reduction in cell capacity displayed in cells sealed with the prior art seal tabs.

TABLE I

| | CELL CAPACITY* AFTER 8 WEEKS STORAGE** AT 130° F. | | | |
|---|---|---|---|---|
| | mAh | | % LOSS | |
| | 1.1 V | 0.9 V | 1.1 V | 0.9 V |
| Control | 104.2 | 105.2 | −13.0 | −12.7 |
| Lot A | 118.5 | 119.5 | −1.1 | −.8 |
| Lot P | 117.0 | 118.0 | −2.3 | −2.0 |

*At 1500-ohm continuous load
**Prior to storage, zinc-air button cell capacities were:
119.8 mAh to 1.1 V
120.4 mAh to 0.9 V Test 3:
To determine the effect upon open circuit voltage, the open circuit voltage of the zinc-air button cells was initially determined. The cells were then stored at 130° F. for a total of twelve weeks. After the fourth, eighth and twelfth weeks, the open circuit voltage for each cell was determined. The results of this test, which are displayed in Table II, clearly indicate that the present invention allows the open circuit voltage of the button cells to remain at functional levels, while the prior art seal tabs often allow the open circuit voltage to drop below functional levels.

TABLE II

| | CELL VOLTAGE AT 130° F. | | | | | | | |
|---|---|---|---|---|---|---|---|---|
| | At 0 Weeks | | At 4 Weeks | | At 8 Weeks | | At 12 Weeks | |
| | OCV | % Fail | OVC | % Fail | OVC | % Fail | OVC | % Fail |
| Control | 1.050 | 22.0 | 0.986 | 22.0 | 1.039 | 27.0 | 1.022 | 23.0 |
| Control-1 | 1.182 | 2.5 | 0.980 | 20.0 | 0.944 | 44.0 | 0.935 | 43.0 |
| Lot A | 1.259 | 0.0 | 1.210 | 0.0 | 1.237 | 0.0 | 1.244 | 0.0 |
| Lot A-1 | 1.263 | 0.0 | 1.203 | 2.5 | 1.232 | 0.0 | 1.254 | 0.0 |
| Lot P | 1.224 | 2.5 | 1.196 | 2.5 | 1.195 | 2.9 | 1.224 | 3.6 |
| Lot P-1 | 1.196 | 5.0 | 1.211 | 0.0 | 1.234 | 0.0 | 1.242 | 0.0 |

Note:
% Fail is percentage of cells with OCV below 0.9 V.

Additionally, Test 3 showed that after twelve weeks the present invention allows one to predict the range of the open circuit voltage of zinc-air button cells, while prior art seal tabs allow a wide variance in the open circuit voltage. The range of the open circuit voltage for zinc-air button cells sealed with various tabs is graphed in FIG. 3.

While the invention has been described in detail according to zinc-air button cells, we do not wish to be limited to that specific embodiment. It is readily understood that the teachings of our invention are applicable generally to all metal-air electrochemical cells, and batteries constructed thereof. As those of ordinary skill in the art to which this invention relates will readily appreciate, novel adaptions and modifications, together with other equivalent embodiments are within the purview and scope of the appended claims.

What is claimed is:

1. An only slightly permeable, removable seal tab, having high initial tack, used to cover the air entry ports of a metal-air electrochemical cell between the time said cell is manufactured and the time said cell is used as a source of electrical power, which comprises a face stock of biaxially-oriented three-ply polypropylene paper interposed between an acrylic adhesive and a plastic film.

2. A seal tab as in claim 1, wherein the thickness of said face stock is between 2.7 mils and 3.7 mils.

3. A seal tab as in claim 1, wherein the thickness of said acrylic adhesive is between 0.5 mils and 1.0 mils.

4. A seal tab as in claim 3, wherein the said acrylic adhesive is 0.7 mils.

5. A seal tab as in claim 1, wherein the said plastic film is selected from the group consisting of polyester film and acetate film.

6. A seal tab as in claim 5, wherein the said plastic film is acetate film between 1.75 mils and 2.25 mils thick.

7. A seal tab as in claim 5, wherein the said plastic film is polyester film between 1.25 mils and 1.75 mils thick.

8. A metal-air electrochemical cell wherein a seal tab according to claim 1 has been mechanically affixed to said cell in such a manner as to cover the air entry port or ports of said cell.

9. A metal air electrochemical cell, wherein a seal tab according to claim 1 has been mechanically affixed to said cell at an elevated temperature in such a manner as to cover the air entry port or ports of said cell.

10. A metal-air electrochemical cell as in claim 9, wherein said seal tab is affixed to said cell at 200° F.

11. A metal-air electrochemical cell as in claim 8 or 9, wherein said cell is a zinc-air cell.

12. A metal-air electrochemical cell as in claim 8 or 9, wherein said cell is a button cell.

* * * * *

UNITED STATES PATENT AND TRADEMARK OFFICE
CERTIFICATE OF CORRECTION

PATENT NO. : 4,649,090

DATED : March 10, 1987

INVENTOR(S) : OLTMAN, et al.

It is certified that error appears in the above—identified patent and that said Letters Patent is hereby corrected as shown below:

Col. 3, Line 45, delete "contructed" and insert --constructed--.

Col. 8, Line 3, delete "metal air" and insert --metal-air--.

Signed and Sealed this

Twenty-second Day of September, 1987

Attest:

DONALD J. QUIGG

Attesting Officer     Commissioner of Patents and Trademarks